June 30, 1959  W. H. HOGAN  2,892,450
CONTROL VALVE

Filed Feb. 23, 1955  3 Sheets-Sheet 1

INVENTOR.
WALTER H. HOGAN
BY
ATTORNEY

June 30, 1959     W. H. HOGAN     2,892,450
CONTROL VALVE

Filed Feb. 23, 1955     3 Sheets-Sheet 2

INVENTOR.
WALTER H. HOGAN
BY
ATTORNEY

United States Patent Office 2,892,450
Patented June 30, 1959

2,892,450

CONTROL VALVE

Walter H. Hogan, Olmsted Falls, Ohio, assignor to Cleveland Pneumatic Industries, Inc., a corporation of Ohio Application February 23, 1955, Serial No. 489,987

6 Claims. (Cl. 121—46.5)

This invention relates to a fluid control mechanism particularly adapted for use in conjunction with power steering of an aircraft.

It is an important object of this invention to provide a fluid control mechanism which is relatively immune to leakage difficulties and particularly adapted for use with steering mechanisms.

It is another object of this invention to provide a simple, easily manufactured three-position valve wherein very little motion is necessary for the valve operation.

It is still another object of this invention to provide a fluid accumulator which is substantially immune to leakage.

It is still another object of this invention to provide a steering control mechanism particularly adapted for use in ground steering of aircraft.

It is still another object of this invention to provide a valve which is susceptible to low cost, high production manufacturing methods.

Further objects and advantages will appear from the following description and drawings, wherein.

Figure 1:
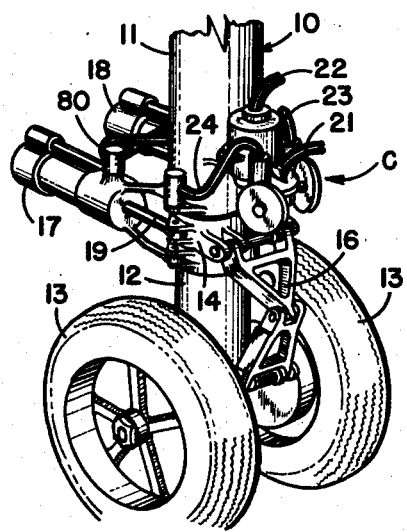
Figure 1 is a fragmentary perspective view of the fluid control mechanism according to this invention shown as it would be applied to a ground steering mechanism of an aircraft.

Figure 1 shows a steering mechanism incorporating a fluid control mechanism C according to this invention as it would be applied to a nose strut 10 of an aircraft landing gear. The strut 10 includes upper and lower telescoping sections 11 and 12 respectively on which the steering system is mounted. Wheels 13 are mounted on the lower end of the lower telescoping section 12 and the upper telescoping section 11 is secured to the aircraft frame (not shown). A steering collar 14 is journaled on the upper telescoping section 11 for rotation relative thereto while being restrained against relative axial motion. Torque arms 16 connect the steering collar 14 and the lower telescoping section 12 and prevent relative rotation therebetween while permitting relative axial motion.

Fluid motor means, which in the illustrated case is a pair of hydraulic cylinders 17 and 18, provided with corresponding piston means 19, are arranged to produce axial forces therebetween in response to fluid under pressure. The cylinders 17 and 18 are pivoted on the upper telescoping section 11 and the piston means are pivoted on the steering collar 14 in such a manner that axial forces between the piston means and cylinders produce turning forces between the steering collar and the upper telescoping section 11 which turn the wheels 13. For a more detailed description of the steering structure per se, reference should be made to my copending application, Serial No. 485,499, filing date February 1, 1955, now abandoned, which was refiled as a continuation-in-part Serial No. 509,667, filed on May 19, 1955, now Patent No. 2,856,133.

A control mechanism C according to this invention is mounted on the upper telescoping section 11 and provides the means for controlling the fluid flow to and from the cylinders 17 and 18. It should be understood that the control mechanism herein set forth could be utilized to control forms of fluid motor means other than the one shown in Figure 1 and that I do not intend to limit the present invention to the particular structure of the steering means. A high pressure fluid inlet 21 is provided on the control mechanism for connecting to a source of fluid under pressure and a system or reservoir return port 22 is connected to the reservoir of hydraulic fluid which would normally be positioned in the airframe itself. Hydraulic lines 23 and 24 connect the cylinders 17 and 18 to the control mechanism C.

The control mechanism C includes essentially three basic assemblies; namely, the control valve V, the damping orifices O and the accumulator A, all of which cooperate to provide adequate control of the steering mechanism in all conditions of operation. The valve controls the pattern of hydraulic flow to and from the cylinders 17 and 18 through the damping orifices which resist shimmying of the steering mechanism and the accumulator insures that there is adequate supply of hydraulic fluid in the system at all times and compensates for volume variances of the hydraulic fluid.

Figure 3:
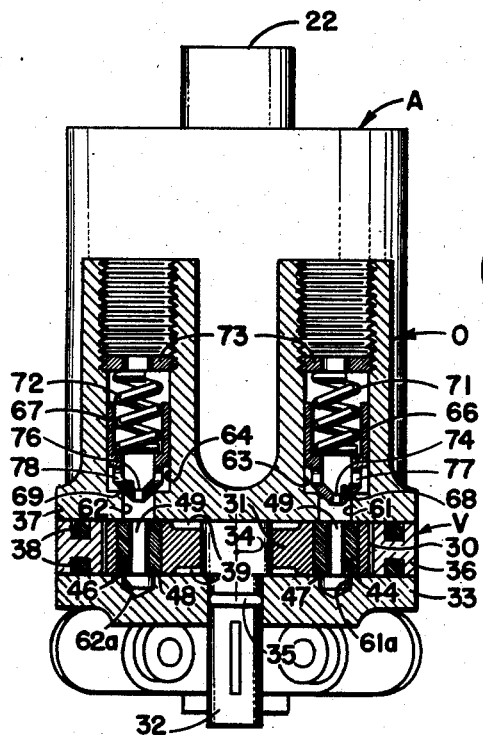
Figure 3 is a longitudinal section taken along 3—3 of Figure 2 showing damping orifices and their cooperation with the valve.
Figure 4:
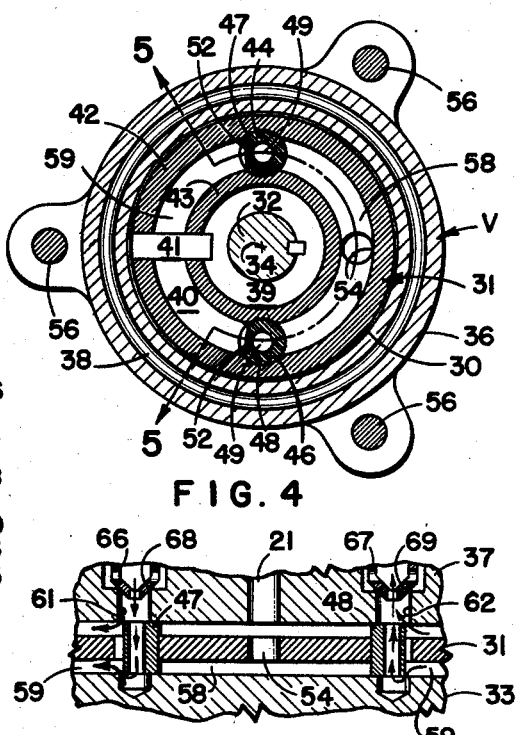
Figure 4 is a plan view taken along 4—4 of Figure 2 showing the structural detail of the valve disc.

The valve V comprises a rotatable disc member 31 which is keyed to a shaft 32 journaled in a lower body member 33 for rotation around its axis 34. A resilient seal 35 is used to prevent leakage between the shaft 32 and the lower body 33. The valve cavity in which the disc member 31 is positioned is defined by the lower body member 33, an annular spacing member 36 providing radial clearance 30 around the disc 31 and a main body 37. Suitable seals 38 prevent leakage between the lower body 33, the spacing member 36 and the main body 37. The disc member 31 is formed with opposed central recesses 39 and opposed similar annular grooves 40 on its end faces. Opposed radial slots 41 extend through the annular ridge portions 42 between the annular grooves 40 and the periphery of the disc and also through the ridge portions 43 between the recesses 39 and annular grooves 40. The disc member 31 is formed with apertures 44 and 46, best seen in Figures 3 and 4, with their axes on opposite sides of the central axis 34 and circumferentially spaced 90° from the slots 41. Bushings 47 and 48 are positioned in the apertures 44 and 46 respectively with a press fit and are formed with central apertures 49 and longitudinal flats 52 best shown in Figure 4. These bushings 47 and 48 are proportioned to extend across the annular groove 40 and separate the right side or high pressure portions 58 (see Figure 4) from the left side or low pressure portions 59. A cross port 54 connects the high pressure portions 58 on both sides of the disc member 31 and a port 55 in the main body 37 connects the high pressure inlet 21 to the high pressure portions 58. The ridge portions 42 and 43 and the ends of the bushings 47 and 48 engage the end surface of the main body 37 on one side and the end surface lower body 33 on the other side and provide a fluid seal therewith. Since this engagement provides a metal to metal contact, the surface along the engagement must be accurately produced. Bolt fasteners 56 are used to securely fasten the assembled valve together.

The main body 37 is formed with two ports or passages 61 and 62 which are coaxial with the apertures 44 and 46 respectively when the disc 31 is in its neutral or normal position and the lower body 33 is formed with similar blind bores 61a and 62a aligned with the ports 61 and 62 respectively. The radius of the ports 61 and 62 and of the bores 61a and 62a is greater than the radial distance to the central portion of the flats 52 and less than the radius of the bushings 47 and 48. Larger bores 63 and 64 coaxial with the ports 61 and 62 are formed in the main body 37 and are adapted to receive orifice members 66 and 67 which are resiliently urged into engagement with seats 68 and 69 in response to the force of springs 71 and 72. Spring retainers 73 are threaded into the main body 37 and securely hold each of the springs 71 and 72 in position.

The orifice members 66 and 67 are each formed with a central orifice 74 and 76 and side ports 77 and 78 respectively through which hydraulic fluid can bypass the orifices 74 and 76 when the orifice members 66 and 67 are displaced from the seats 68 and 69. The hydraulic line 23 is connected between the larger bore 63 and the cylinder 18; and the hydraulic line 24 is connected between the larger bore 64 and the cylinder 17 thereby providing a fluid connection between the cylinders 17 and 18 to the valve mechanism. A cross connection is provided between the cylinders by hydraulic lines 80 to complete the fluid connection.

Figure 2:
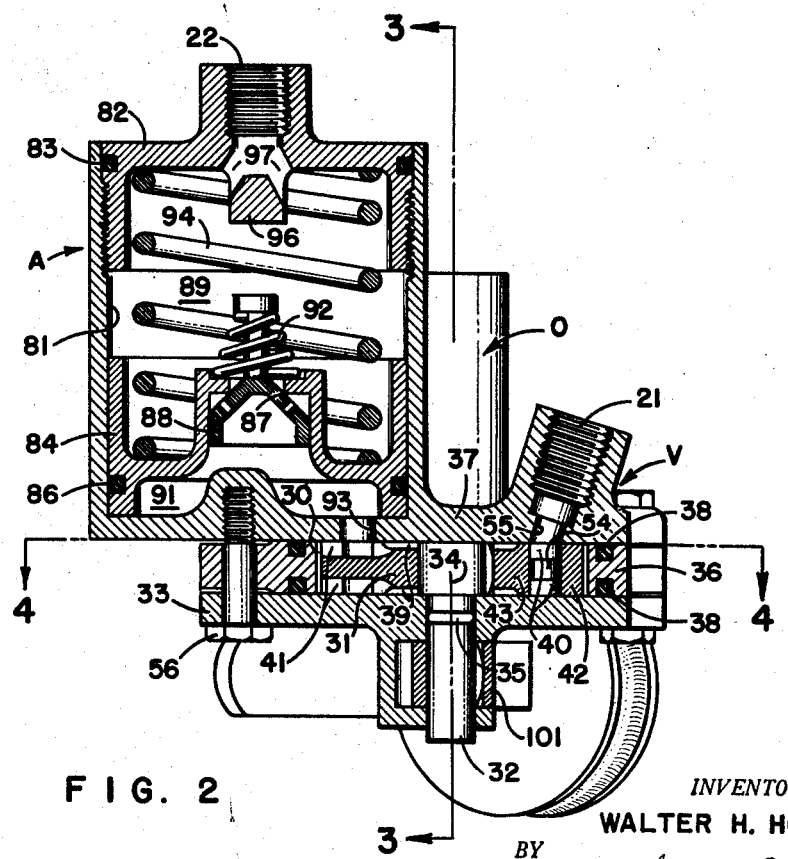
Figure 2 is a longitudinal section taken through the center line of the valve showing the details of the valve and the accumulator.

The accumulator A (best shown in Figure 2) is in the fluid circuit between the outlet of the valve and the reservoir return port 22. This accumulator insures that a minimum pressure is always maintained in the steering system and compensates for volume changes in the hydraulic fluid therein. The accumulator A is contained within a large bore 81 formed in the main body 37 which is closed at its upper end by an end member 82 threaded into the bore 81. A fluid seal 83 prevents leakage between the walls of the bore 81 and the end member 82. A piston 84 slidable within the bore 81, is provided with a fluid seal 86 and a central valve seat 87 against which a valve poppet 88 is normally seated. The piston serves to separate the fluid cavity defined by the bore 81 and the end member 82 into two chambers 89 and 91. The valve poppet 88 is normally held in engagement with the valve seat 87 by a spring 92 thereby normally isolating the two chambers 89 and 91. A port 93 in the main body 37 connects the chamber 91 with the main control valve and a spring 94 biases the piston 84 toward the lower extreme position. The end member 82 is formed with a central boss 96 engageable with the upper end of the valve poppet 88 and serves to limit the upward travel of the valve poppet with the piston 84 when the piston approaches the upper extreme position of travel. Fluid passages 97 connect the chamber 89 and the reservoir return port 22 which in turn is connected to the hydraulic fluid reservoir (not shown) by suitable hydraulic lines.

Figure 10:
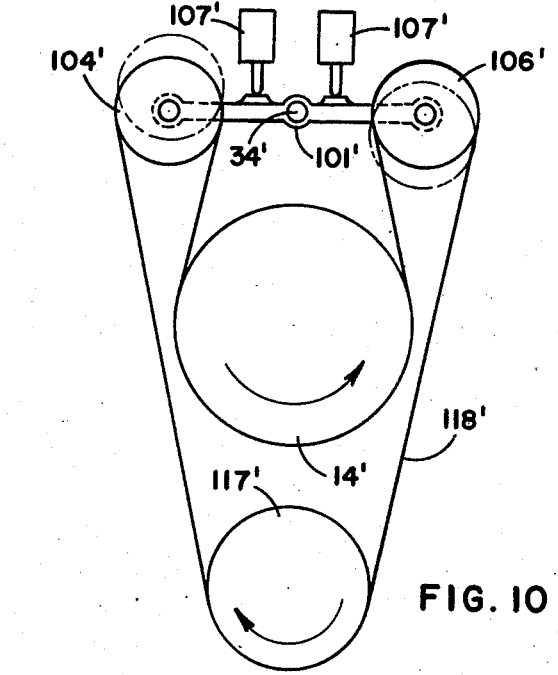
Figure 10 is a diagrammatic view of the servo mechanism used to control the valve operation.
Figure 11:
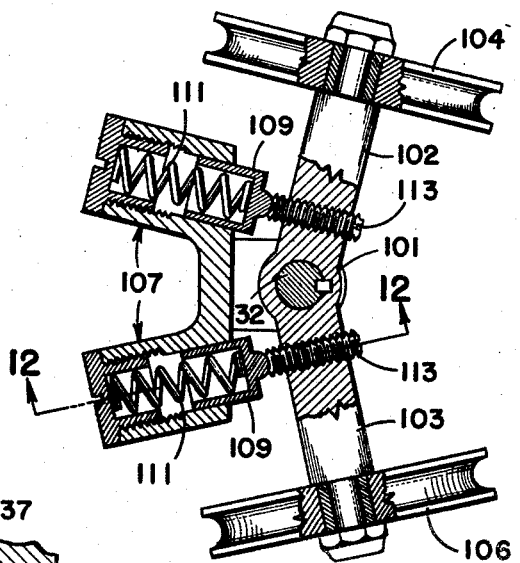
Figure 11 is a fragmentary cross section showing the centering mechanism for the valve; and, Figure 12 is a fragmentary cross section taken along 12—12 of Figure 11.
Figure 12:
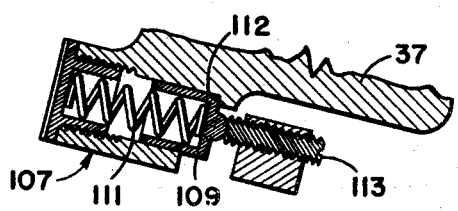

Reference should now be made to Figures 10, 11 and 12. Keyed to the lower end of the shaft 32 is a control member 101 which is formed with two laterally extending arms 102 and 103 on each of which is mounted a pulley 104 and 106 respectively. Adjacent to each arm 102 and 103 is a centering spring assembly 107 rigidly attached to the main body 37. Each of the centering spring assemblies is provided with a spring biased plunger 109 resiliently urged toward the associated arm by a spring 111. As shown in Figure 12, a stop surface 112 is formed on the main body 37 to limit the movement of each plunger toward the associated arms in response to the force of the spring 111. An adjustment set screw 113 is threaded into each of the arms 102 and 103 so as to engage the ends of the respective plungers 109 to provide adjustment of the neutral or normal position of the valve.

Figure 8:
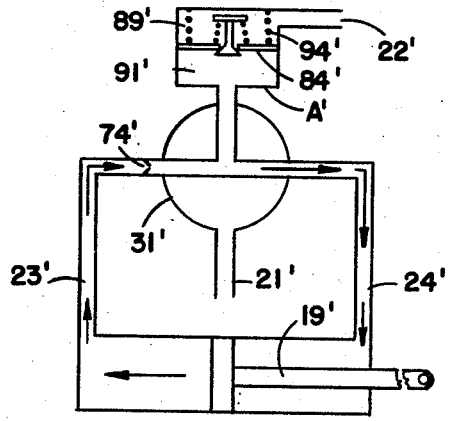
Figure 8 is a diagrammatic view of the entire steering system showing the operation when the valve mechanism is in the shimmy damping position.
Figure 9:
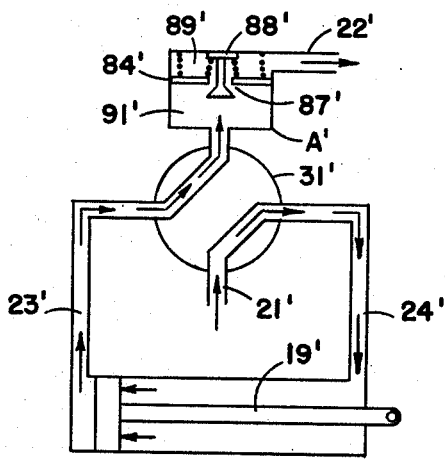
Figure 9 is a diagrammatic view showing the entire system when the valve is in one of the steering positions.

In the diagrammatic views of Figures 8 through 10, numerals are the same as those used in the structural figures; however, a prime is added to indicate that the parts are diagrammatically shown. In Figure 10, the steering collar is indicated at 14' and a steering pulley, manually operated by the operator of the aircraft, is shown at 117'. A control cable 118' extends around the pulley 117', over the pulley 106', around the steering collar 14', over the pulley 104' and back to the pulley 117'. The pulleys 104' and 106' on the control arm member 101' are mounted on the control mechanism which is secured to the upper telescoping member of the strut so they pivot about the fixed axis 34'. When the pulley 117' is rotated to the right as shown by the arrow, the cable 118' pulls the pulley 106' to the position shown in phantom and permits the pulley 104' to move to its phantom position. Thus turns the arm member 101' about its pivot and turns the valve disc 31 which supplies liquid under pressure to the cylinders 17 and 18 and turns the steering collar 14' in the direction indicated by the arrow. Rotation of the steering collar 14' causes the cable 118' to return the arm member 101' to its original position and stop the operation of the power steering. It is apparent, therefore, that this servo mechanism will turn the steering collar 14' through an angle directly proportional to the turning angle of the pulley 117'.

Figure 5:
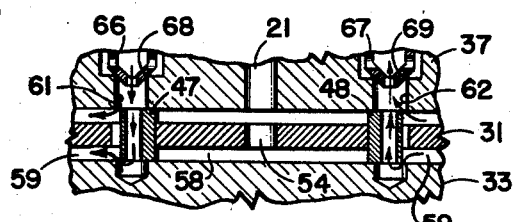
Figure 5 is a view taken along 5—5 of Figure 4 showing the relative position of the valve elements in the neutral or normal position.

In operation, fluid under pressure is supplied to the high pressure inlet 21 from a source of fluid under pressure in the aircraft itself and the reservoir return port 22 is connected to the aircraft reservoir. Thus high pressure fluid is supplied to the high pressure portions 58 on both sides of the valve disc 31 through the ports 54 and 55. Since the high pressure portions 58 are isolated from the low pressure portions 59 by the ridges 42 and 43 and by the bushings 47 and 48, the remaining portions of the valve disc 31 are all exposed to low pressure. The low pressure portions 59, both of the recesses 39 and the periphery of the disc 31 are all connected to the chamber 91 of the accumulator through the port 93 and the slots 41 so a completely balanced valve results. Since the ports 61 and 62 and bores 61a and 62a are coaxial with the bushings 47 and 48, and since the flats 52 have central portions spaced from the axis of the bushings 47 and 48 a distance less than the radius of the ports 61 and 62, the ports 61 and 62 are also in fluid communication with the low pressure portions 59 and in turn the chamber 91. This is the situation existing in diagrammatic views of Figures 8 and 10. As shown in Figure 8, the high pressure inlet 21' is isolated from the system and the ends of the cylinders are connected to each other and to the accumulator. If the piston 19' shown in Figure 8 moves to the left, fluid will flow upwardly through the hydraulic line 23' into the valve disc area through the orifice 74'. From there it will flow around the low pressure portions and back to the other side of piston 19' through the hydraulic line 24'. Since the flow in this situation will be as indicated by the arrows in Figure 5, the fluid under pressure will lift the orifice member 67 against the force of the spring 72 away from the seat 69 to provide substantially unrestrained flow to the right side of the piston. The accumulator A', by means of the spring 94', will maintain a pressure in the chamber 91' and insure that sufficient fluid will be present to keep the cylinder full. The springs 71 and 72 should be sized so that the pressure in the system determined by the accumulator spring 94 is sufficient to lift the orifice members 66 or 67 away from their seats when the fluid flow is in the direction away from the valve. If the flow of the hydraulic fluid is in the opposite direction to that shown in Figures 5 and 8, the orifice member 67 will seat to restrict the flow and the orifice member 66 will move away from the seat to allow substantially unrestricted flow. It is apparent that when the valve disc 31 is in its normal or neutral position, no power steering takes place and that damping is introduced into the flow circuit to resist the rapid motions which occur when the wheels 13 shimmy.

Figure 6:
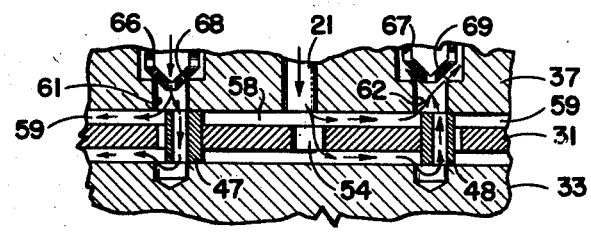
Figure 6 is a view similar to Figure 5 showing the position of the valve elements when the mechanism is in one position of steering.

When the valve disc is rotated so as to move to the position as shown in Figures 6 and 9, one condition of steering is present. At this time high pressure fluid communicates along the high pressure portion 58 to the port 62 past the orifice member 67 to one side of the piston means 19. At the same time the other side of the piston means is connected to the low pressure portion 59 through the orifice member 66 and the port 61. Figure 6 shows the position of the valve members and illustrates that the two bushings move to the right to provide fluid communication between the high pressure portion 58 and the port 62. Under these conditions the high pressure fluid is supplied to the piston and causes it to move in one direction and results in a displacement of fluid from the other side of the piston to the low pressure portion 59 as mentioned above. Referring to Figure 9, since the hydraulic fluid is being added to the system from the high pressure source, there will be a flow into the chamber 91' which will move the piston 84' upwardly until the valve poppet 88' reaches the end of its travel. At this time further movement of the piston 84' in the upward direction moves the valve seat 87' away from the valve poppet 88' and connects the system to the reservoir return port 22'. When sufficient turning occurs, the servo mechanism of Figure 10 returns the valve disc 31' to its neutral position and the supply of fluid under pressure is isolated from the steering mechanism. The piston 84 then moves down under the influence of the spring 94' until the valve poppet 88' is seated and isolates the chamber 89' from the chamber 91'. Therefore, each time the power steering is used, the accumulator A is filled to insure that there will be sufficient fluid in the system. Also any leakage past the valve V flows to the accumulator A and assists in maintaining it full.

Figure 7:
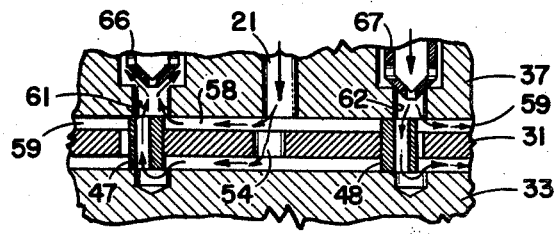
Figure 7 is a view similar to Figure 5 showing the position of the valve elements when the mechanism is in the position of steering opposite to the one shown in Figure 6.

Referring to Figure 7, when the valve disc is moved in the direction opposite to the direction shown in Figure 6, fluid under pressure is supplied to the port 61 and port 62 is connected to the reservoir return in a manner similar to that described above. In this position, steering will be in the direction opposite to that shown in Figures 6 and 9.

It should be noted that there is only one sliding external seal in the entire control system and that this seal 35 on the shaft 32 is exposed to the low pressure fluid, the pressure of which is determined by the spring 94. It should also be noted that all of the other external seals are exposed to low pressure so leakage is essentially no problem. Any high pressure fluids which leak past the ridge portions 42 and 43 or the bushings 47 and 48 merely enter the low pressure portion of the valve and is returned to the reservoir through the accumulator. Therefore, a valve mechanism according to this invention will be substantially immune to loss of fluid due to leakage.

Because the bushings 47 and 48 have a diameter only slightly larger than the ports 61 and 62, only a small amount of movement is necessary to change the valve from the neutral position to either of the positions of steering. Therefore, a valve according to this invention is very sensitive to movement and will act very rapidly.

Those skilled in the art will recognize that a valve mechanism according to this invention may be manufactured by low cost manufacturing techniques and that the resulting device gives a relatively long trouble free service with a minimum amount of maintenance.

Although a preferred embodiment of this invention is illustrated, it will be realized that various modifications of the structural details may be made without departing from the mode of operation and the essence of the invention. Therefore, except insofar as they are claimed in the appended claims, structural details may be varied without modifying the mode of operation. Accordingly, the appended claims and not the aforesaid detailed description are determinative of the scope of the invention.

I claim:

1. A valve comprising a body assembly defining a cylindrical cavity having an end face, a valve disc in said cavity rotatable in either direction from a first position of angular alignment, at least one end surface of said disc being formed with an annular groove and central circular recess inwardly spaced therefrom, a valve stem connected to said disk radially within said recess, a pair of bushings in said disc extending radially across said groove separating it into first and second portions, means connecting said second portion with said recess and the periphery of said disc, said bushings and the end walls of said disc adjacent to said groove engaging said end face thereby closing said first portion, said body being formed with a first port supplied with high pressure fluid in fluid communication with said first portion, a second port exhausting low pressure fluid in fluid communication with said second portion and two passages both in fluid communication with said second portion only when said disc is in said first position, the width of said bushings along said groove being greater than the corresponding width of said passages.

2. A valve comprising a body assembly defining a cylindrical cavity having end faces, a valve disc in said cavity rotatable in either direction from a first position of angular alignment, each end surface of said disc being formed with a circular groove and central circular recess inwardly spaced therefrom, a valve stem extending through said body connected to said disk radially within said recess, a seal engaging said body and stem preventing leakage out of said body along said stem, a pair of partitions in said disc extending radially across said grooves separating them into first and second portions, first means providing fluid communication between said first portions, and second means permanently connecting said second portions with said recesses and the periphery of said disc, said partitions and the end walls of said disc adjacent to said groove engaging said end faces thereby closing said first portions, said body being formed with a first port supplied with high pressure fluid in fluid communication with said first portions, a second port exhausting low pressure fluid permanently in fluid communication with said second portions and two passages both in fluid communication with said second portions when said disc is in said first position, the circular extent of said partition with respect to said groove being greater than that of said passages.

3. A valve comprising a body assembly defining a cylindrical cavity having end faces, a valve disc in said cavity rotatable in either direction from a first position of angular alignment, each end surface of said disc being formed with a circular groove and central circular recess inwardly spaced therefrom, a pair of tubular bushings in said disc extending radially across said grooves separating them into first and second portions, first means providing fluid communication between said first portions and second means connecting said second portions with said recesses and the periphery of said disc, said bushings and the end walls of said disc adjacent to said groove engaging said end faces thereby closing said first portions, said body being formed with a first port in fluid communication with said first portions, a second port in fluid communication with said second portions and two passages coaxial with said bushings when said disc is in said first position, each of said bushings extending into the second portion of said groove a distance from its axis less than the radius of said passages and into said first portion a distance from its axis greater than said passage radius whereby said passages are in communication with said second portions when said disc is in said first position.

4. A valve comprising a body assembly defining a cylindrical cavity having end faces and a centrally located axial bore, a valve disc in said cavity provided with a shaft journaled in said bore for rotation in either direction from a first position of angular alignment, a fluid seal between said shaft and said bore, said disc being formed with a circular groove and an inner circular recess adjacent to said shaft in each end face, a pair of tubular bushings in said disc with the axis thereof parallel to and equally spaced from said shaft extending radially across each of said grooves separating them into first and second portions, said disc being formed with a port providing fluid communication between said first portions and radial slots connecting said second portions with said recesses and the periphery of said disc, said bushings and the end walls of said disc adjacent to said grooves engaging said body faces thereby closing said first portions, said body being formed with a high pressure inlet in fluid communication with said first portions, a low pressure outlet in fluid communication with said second portions and a passage coaxial with each of said bushings when said disc is in said first position, each of said bushings having first peripheral portion adjacent to said second portions spaced from the axis thereof a distance less than the radius of said passages and a second peripheral portion adjacent to said first portions spaced from the axis thereof a distance greater than said passage radius whereby said passages are in fluid communication with said second portions when said disc is in said first position.

5. A valve assembly comprising a housing, a plate valve rotatable in said housing from a first position, parallel flat surfaces on said housing engaged by similar surfaces on both sides of said plate affording fluid tight joints therebetween, first and second grooves within each surface of said valve, first and second means affording intercommunication between said first and second grooves respectively, first and second ports and a pair of passages through the face of said housing, said first and second ports opening into said first and second grooves respectively, said passages opening into said second groove when said valve is in said first position, a duality of circularly extending lands separating said grooves on both sides of said plate, the circular extent of said lands being greater than the diameter of said passages whereby when said valve is rotated from said first position one of said passages is closed from said second grooves and brought into communication with said first grooves.

6. A valve assembly comprising a housing, a valve plate rotatable in said housing from a first position, parallel flat faces in said housing engaging similar surfaces on both sides of said plate affording fluid tight joints therebetween, a first port opening through one of the faces of said housing adapted to be supplied with fluid under pressure, a second port opening through one of the faces in said housing adapted to exhaust fluid under pressure, said plate being formed with similar openings in both of said similar surfaces each being in communication with said first port, a pair of passages opening through one of the faces of said housing both in communication with said second port when said plate is in the first position, a pair of spaced lands on said plate having a width greater than the diameter of said passages and positioned so as to isolate said passages from said first port only when said plate is in said first position whereby one of said passages is isolated from said second port and brought into communication with said first port when said plate is rotated from said first position.

References Cited in the file of this patent

UNITED STATES PATENTS

| 1,519,670 | Danstrup | Dec. 16, 1924 |
| 2,042,186 | Peterson | May 26, 1936 |
| 2,047,615 | Chadborn | July 14, 1936 |
| 2,202,961 | Parker | June 4, 1940 |

FOREIGN PATENTS

| 581,814 | Great Britain | Oct. 25, 1946 |